US007119803B2

(12) United States Patent
Stanley et al.

(10) Patent No.: US 7,119,803 B2
(45) Date of Patent: Oct. 10, 2006

(54) METHOD, APPARATUS AND ARTICLE FOR DISPLAY UNIT POWER MANAGEMENT

(75) Inventors: Randy P. Stanley, Aptos, CA (US); Siripong Sritanyaratana, Union City, CA (US)

(73) Assignee: Intel Corporation, Santa Clara, CA (US)

( * ) Notice: Subject to any disclaimer, the term of this patent is extended or adjusted under 35 U.S.C. 154(b) by 208 days.

(21) Appl. No.: 10/331,499

(22) Filed: Dec. 30, 2002

(65) Prior Publication Data

US 2004/0125099 A1 Jul. 1, 2004

(51) Int. Cl.
*G09G 5/00* (2006.01)
*G06F 1/26* (2006.01)

(52) U.S. Cl. .................................... 345/211; 713/320

(58) Field of Classification Search ................ 345/211, 345/212, 213, 204

See application file for complete search history.

(56) References Cited

U.S. PATENT DOCUMENTS

| | | | | | |
|---|---|---|---|---|---|
| 5,598,565 | A | * | 1/1997 | Reinhardt | 713/323 |
| 5,638,083 | A | * | 6/1997 | Margeson | 345/10 |
| 5,991,883 | A | * | 11/1999 | Atkinson | 713/300 |
| 6,687,838 | B1 | * | 2/2004 | Orenstien et al. | 713/320 |
| 6,859,886 | B1 | * | 2/2005 | Johnson | 713/600 |
| 6,900,820 | B1 | * | 5/2005 | Kataoka et al. | 345/690 |
| 2001/0045943 | A1 | * | 11/2001 | Prache | 345/204 |
| 2002/0075251 | A1 | * | 6/2002 | Millman et al. | 345/211 |
| 2002/0154102 | A1 | * | 10/2002 | Huston | 345/204 |
| 2003/0020699 | A1 | * | 1/2003 | Nakatani et al. | 345/204 |
| 2003/0128198 | A1 | * | 7/2003 | Mizuyabu et al. | 345/204 |
| 2004/0252115 | A1 | * | 12/2004 | Boireau | 345/211 |

* cited by examiner

*Primary Examiner*—Ryan Yang
(74) *Attorney, Agent, or Firm*—Marshall Gerstein & Borun LLP

(57) ABSTRACT

A method to manage the power consumption of a display unit is provided. The method determines if a graphics-intensive event is occurring, uses a first refresh rate if the graphics-intensive event is occurring, and uses a second refresh rate different than the first refresh rate if the graphics-intensive event is not occurring. An apparatus for performing the method, and an article including a machine-accessible medium that provides instructions that, if executed by a processor, will cause the processor to perform the method are also provided.

9 Claims, 3 Drawing Sheets

METHOD, APPARATUS AND ARTICLE FOR DISPLAY UNIT POWER MANAGEMENT

TECHNICAL FIELD

Methods, apparatuses, and articles for power management are disclosed. More specifically, methods, apparatuses and articles for power management of a display unit for use with a computing device are disclosed.

BACKGROUND

Originally, computers were rather elaborate constructions, the earliest of which took several rooms to house. Over time, the size of the computer was reduced dramatically, such that a computer capable of being placed on a desktop became commonplace.

Additional developments led to further reductions in the size of the computer, leading to computing devices having greater mobility and portability. In particular, a new type of portable computing device, commonly referred to as a laptop, was developed, together with a host of other portable computing devices, such as the Personal Digital Assistant (PDA), the mobile telephone and the like.

However, mobility and portability comes at a cost. Lacking a connection to an external power source, portable computing devices require an on-board power source, typically in form of one or more batteries. While such batteries are usually rechargeable, there is a finite limit on the amount of time that a portable computing device may be used between charging events.

As a consequence, power consumption is a very important consideration in the design of portable computing devices. Power consumption is also an important operational consideration, and the use of power management utilities and screensavers has become commonplace in laptop computers.

BRIEF DESCRIPTION OF THE DRAWINGS

The disclosed methods, apparatuses and articles are illustrated more or less diagrammatically in the accompanying drawings wherein.

DETAILED DESCRIPTION

Figure 1:
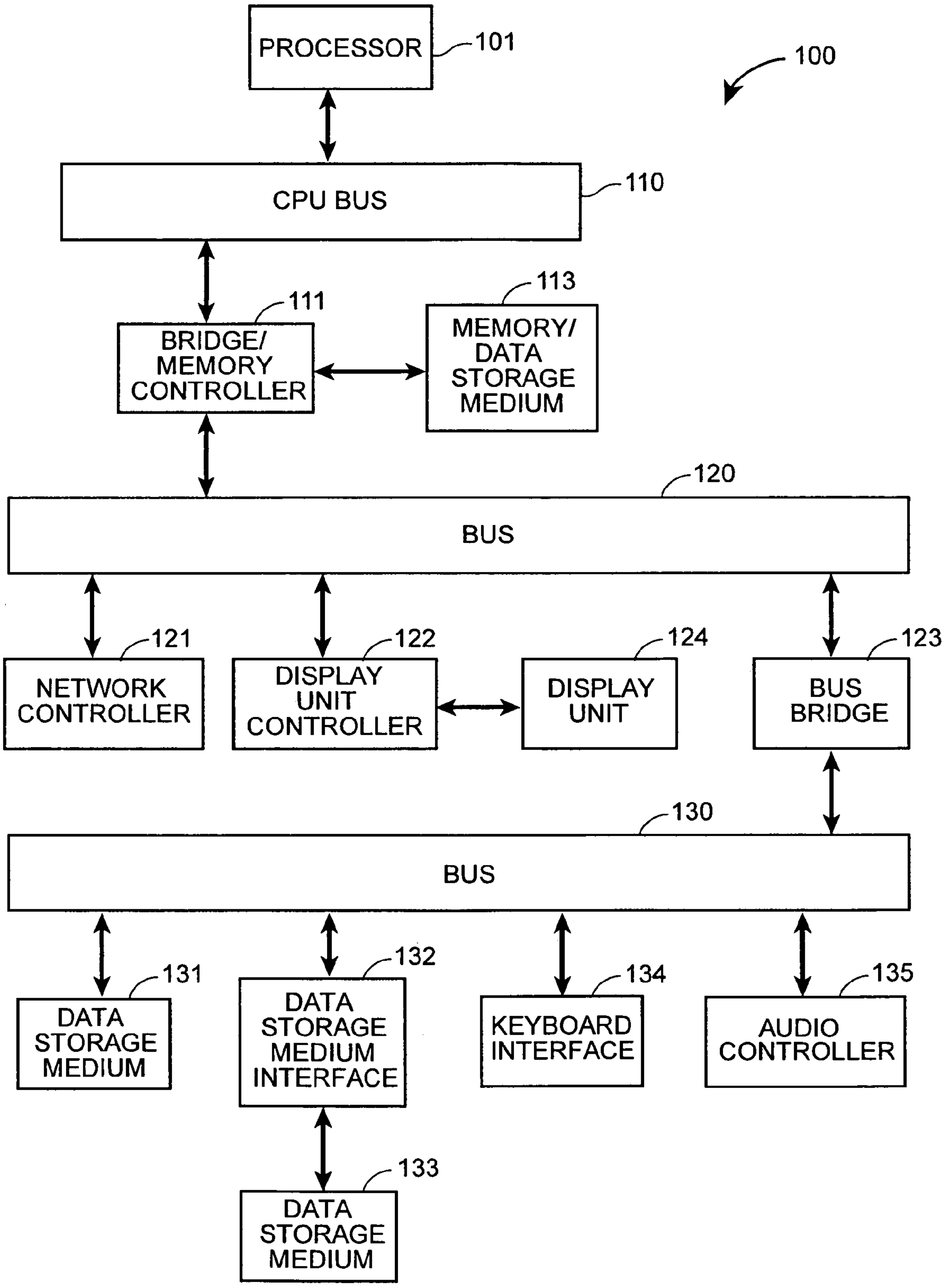
FIG. 1 is a block diagram of a portable computing device.

FIG. 1 shows an embodiment of a portable computing device 100. In particular, the portable computing device 100 shown in FIG. 1 may be a laptop computer. However, this is merely by way of illustration and not by way of limitation, for the portable computing device 100 may also be a personal digital assistant (PDA), mobile phone, Linux machine, or any other computing device.

The portable computing device 100 may include a processor 101. The processor 101 may be operatively coupled via a CPU bus 110 to a bridge/memory controller 111. The bridge/memory controller 111 may, in turn, be operatively coupled to a memory/data storage medium 113.

Furthermore, the bridge/memory controller 111 may be operatively coupled to a bus 120. Via the bus 120, the bridge/memory controller 111 may be operatively coupled to a network controller 121, a display unit controller 122, and a bus bridge 123. As shown, the display unit controller 122, which may include a processor, may be operatively coupled to a display unit 124.

The display unit 124 may be an LCD panel display, as is typically used for portable computing devices such as laptop computers, although this reference is not made by way of limitation, for other types of display units may be used as well, for example, cathode ray tubes (CRT). The display unit 124 may have at least two refresh rates. For example, the display unit 124 may have a first refresh rate of 50 Hz and a second refresh rate of 60 Hz. At the first refresh rate, the images generated on the display unit 124 may appear to flicker if there is movement within the image. On the other hand, at the second refresh rate, motion in images generated on the display unit 124 may tend to mimic the flow of normal motion, and there may be less image flicker occurring.

The bus bridge 123 may be operatively coupled, via a bus 130, to additional elements. For example, as shown in FIG. 1, the bus bridge 123 may be operatively coupled to a data storage medium 131, a data storage medium interface 132 (e.g., a magnetic disk drive, a compact disk (CD) drive or a digital versatile disk drive (DVD) drive) and associated data storage medium 133 (e.g., a magnetic disk, a CD or a DVD), a keyboard interface 134 and an audio controller 135.

One or more sets of instructions may operate within the processor 101. For example, an operating system (OS) may be operating within the processor 101. According to the present embodiment, a set of instructions may also operate within the processor 101 to carry out a power management method. Alternatively, it will be recognized that a set of instructions may operate within the processor of the display unit controller 122, for example, to carry out a power management method.

In general terms, the power management method of the present embodiment may operate to vary the refresh rate of the display unit 124 according to the presence or absence of a graphics-intensive activity. As noted above, moving images generated on the display unit 124 operating at a slower refresh rate may experience more image flicker than when the display unit 124 is operating at a faster refresh rate. The power management method according to the present embodiment may cause the display unit 124 to use a slower refresh rate when there is a limited amount of motion in the images being generated, such as when a cursor is moving in response to the movement of a mouse or the entering of a character on a keyboard. On the other hand, the power management method may cause the faster refresh rate to be used when there is considerable motion in the images being generated by the display unit 124, such as when a video is being shown or during the playing of a three-dimensional video game.

Moreover, it will be recognized that while the power management method may described with reference to changes in the display unit refresh rate between a first refresh rate and a second refresh rate, the disclosed power management method is not limited to the use of only two refresh rates. For example, a series of refresh rates may be used, each for a different level of graphics-intensive activity. In such an instance, a highest level of activity may be defined as when a video or a three-dimensional video game is being displayed. An intermediate level, in turn, may be defined as when there is some level of activity, such as when the images displayed are responding to a series of keystrokes or mouse clicks, or movement of the pointer across the screen. A lowest level of activity may be defined as the circumstance where a static image is being displayed for viewing, as when a user is contemplating the information displayed on the display unit 122. In such circumstances, a first refresh rate (e.g., 60 Hz) may be used at the highest level of activity, a second refresh rate (e.g., 50 Hz) may be used in the intermediate level, and a third refresh rate (e.g., 30 Hz) may be used at the lowest level. It will be further recognized that it is not necessary to define certain discrete levels of activity corresponding to specific refresh rates, but a continuum of activity may be defined corresponding to different rates within a range of refresh rates.

Figure 2:
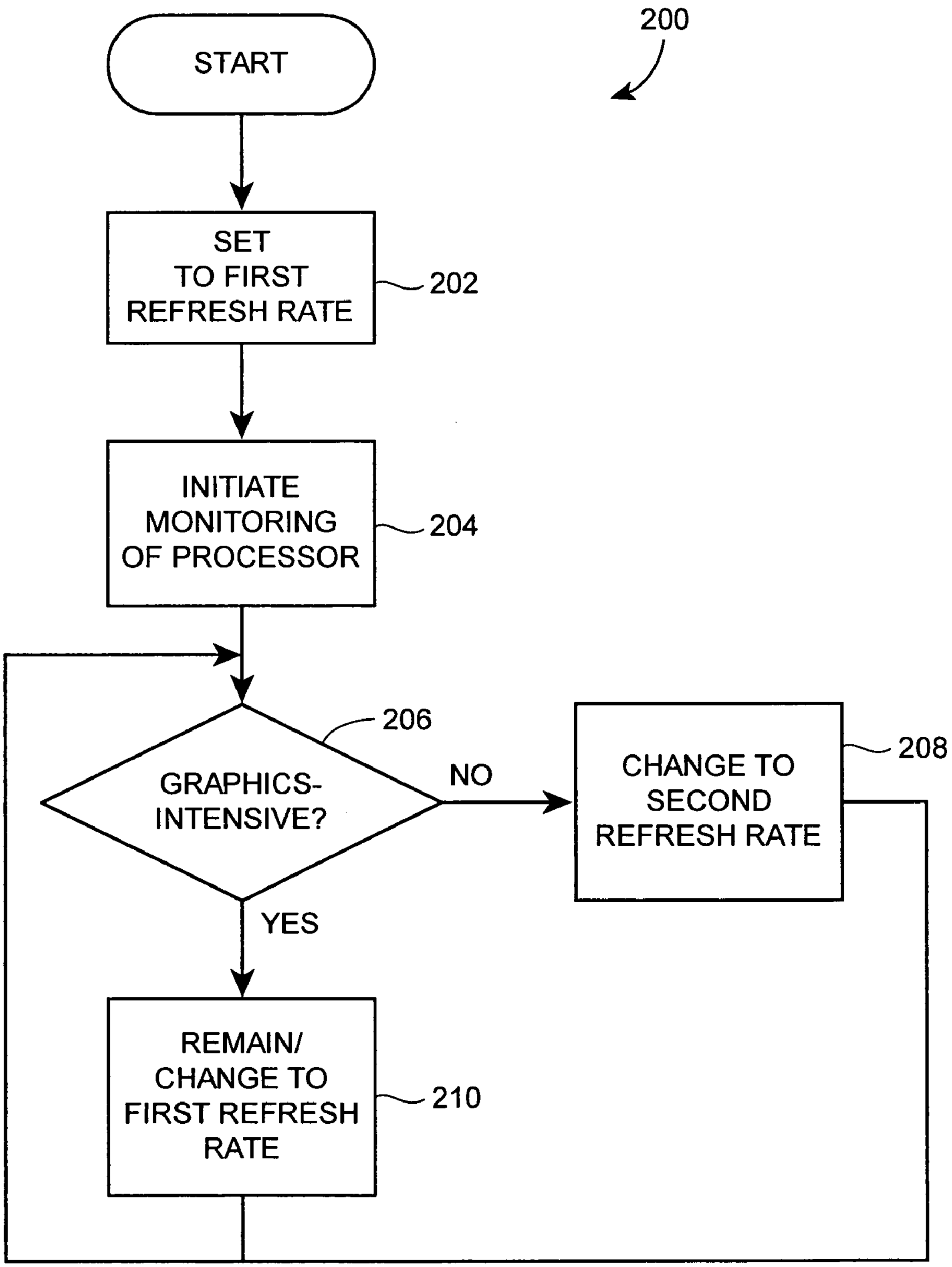
FIG. 2 is a flow chart illustrating a first method of managing power consumption of a display unit.
Figure 3:
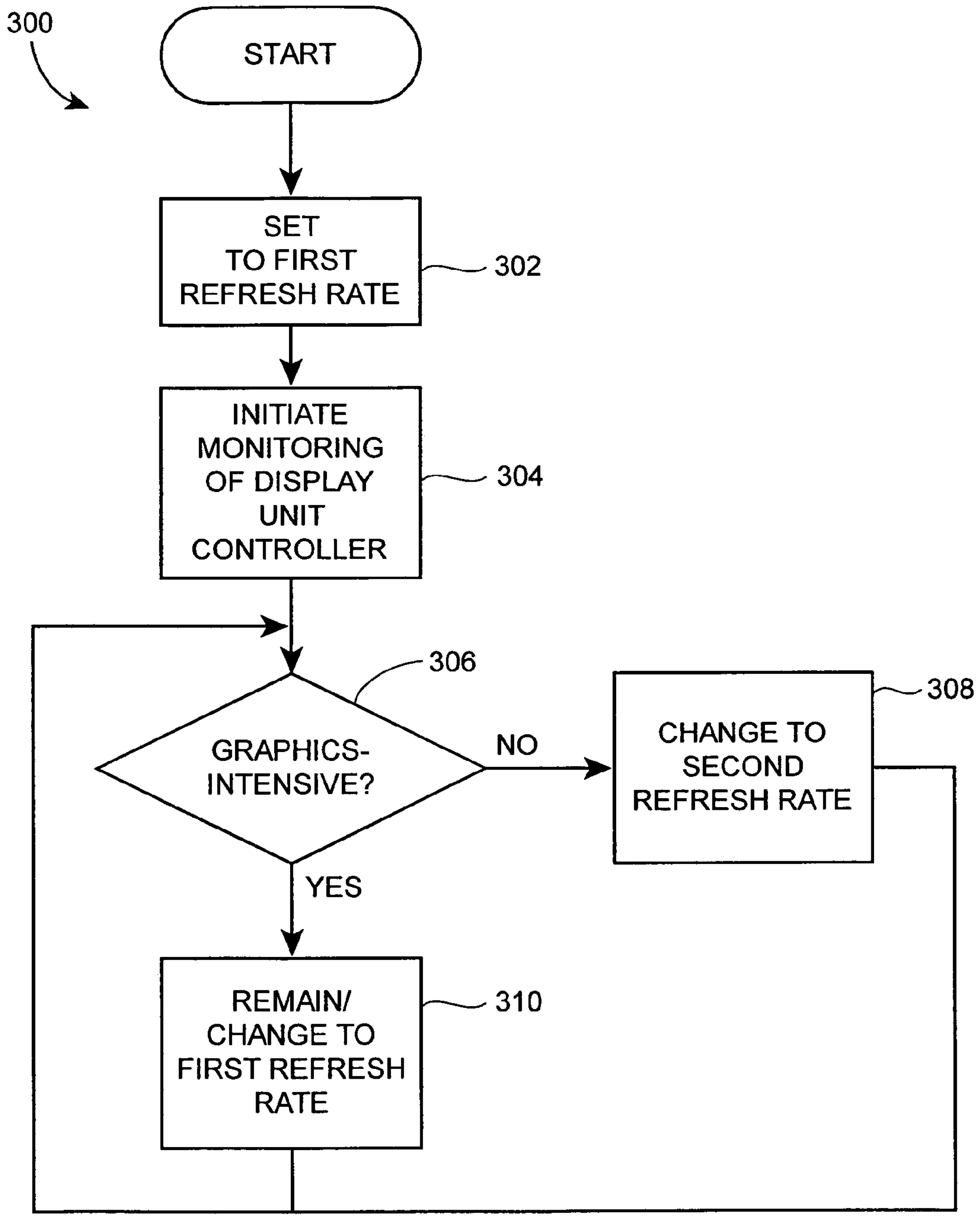
FIG. 3 is a flow chart illustrating a second method of managing power consumption of a display unit.

FIGS. 2 and 3 are flow charts of different examples of the power management method. In FIG. 2, the method may monitor processor and operating system activity to make a determination about power management. In FIG. 3, the power management method may monitor the display unit controller activity to make determinations about power management.

As shown in FIG. 2, a power management method 200 for use with a display unit, such as the display unit 124, may start at block 202. At the block 202, the refresh rate of the display unit 124 may be set to a default rate which may limit image flicker and provide continuity of movement of images displayed by the display unit 124. For purposes of illustration, the default rate may be 60 Hz for an LCD display unit. At block 204, the power management method 200 may initiate monitoring of the processor 101.

At block 206, the power management method 200 may determine if a graphics-intensive event is occurring. In particular, at block 206, the power management method 200 may determine if the processor 101 is at an idle (e.g., C3) state. If the processor 101 is at an idle state, then the power management method 200 may pass to block 208, wherein the refresh rate of the display unit 124 may be changed to a second, slower refresh rate. That is, if the graphics-intensive event is not occurring, a second refresh rate which is slower than the first refresh rate may be used. For example, for an LCD display unit, the second refresh rate may be 50 Hz.

Alternatively, if the power management method 200 detects that the processor 101 is not in the idle state or has recently changed from the idle state to a state other than the idle state (e.g., an active state), then the method may pass to block 210. At block 210, the refresh rate of the display unit 124 either may remain or may be changed to the first refresh rate. According to the example provided above, the default rate in this instance is 60 Hz. That is, if the graphics-intensive event is occurring, the first refresh rate which is faster than the second refresh rate may be used.

It will be recognized that variations of the power management method 200 described above may be possible which remain within the scope of the present embodiment. As just one such example, for aggressive power management, the first refresh rate may be the slower of the two refresh rates. Using the numbers provided above for an LCD display unit, the first refresh rate may be 50 Hz. The method may then detect if the processor is not in the idle state, and change to a second, higher refresh rate (e.g., 60 Hz) if the processor is not in the idle state. If the processor remains at or changes to the idle state, the first, slower refresh rate may be used.

By contrast, as shown in FIG. 3, a power consumption method 300 may monitor the operation of the display unit controller 122 as opposed to the processor 101. For example, the display unit controller 122 may be programmed to provide data quantifying the work being performed by the display unit controller 122, for example, the number of writes being made to the frame buffer, i.e., the frame buffer update. The determination as to whether a graphics-intensive event has occurred may then be made on either an absolute basis or a relative basis. For example, the change in a level of activity, such as the frame buffer update, may be viewed as to the absolute value of the activity, or whether the level of activity exceeds or drops below a threshold (e.g., a frame buffer update threshold). As an alternative, the determination as to whether a graphics-intensive event is occurring may depend on whether the display unit controller 122 is idle or whether the display unit controller 122 is active.

Referring now to FIG. 3 in detail, the power management method 300 may begin at a block 302, wherein the refresh rate of the display unit 124 is set to a default refresh rate, for example, 60 Hz for an LCD display unit. Monitoring of the display unit controller 122 may be initiated at block 304. At block 306, the power management method 300 may monitor the display unit controller 122 to determine whether a graphics-intensive event is occurring. If the graphics-intensive event has not occurred, the refresh rate of the display unit 124 may be set to the second lower level at block 308, for example, 50 Hz for an LCD display unit. Alternatively, at block 310, if the graphics-intensive event is occurring, then the refresh rate of the display unit 124 may remain at or may be changed to, for example, 60 Hz for an LCD display unit.

It will be recognized that, as was explained above relative to FIG. 2, the power management method 300 described above may be altered or varied and yet remain within the scope of this embodiment. For example, the default refresh rate of the display unit 124 may be, for example, set to 50 Hz for an LCD display unit. In such a case, the program may determine whether a graphics-intensive event is occurring, in which case the refresh rate is changed from 50 Hz to 60 Hz. In the alternative, the refresh rate would remain at or be changed to 50 Hz.

It will also be recognized that a set of instructions for implementing the power management method 200, 300 may be stored on a machine-accessible medium. A machine-accessible medium includes any mechanism that provides (i.e., stores and/or transmits) information in a form accessible by a machine (e.g., a computer, network device, personal digital assistant, manufacturing tool, any device with a set of one or more processors, etc.). For example, a machine-accessible medium includes recordable/non-recordable magnetic, optical and solid-state media (e.g., read only memory (ROM), programmable read only memory (PROM), erasable programmable read only memory (EPROM), electrically erasable programmable read only memory (EEPROM), random access memory (RAM), magnetic disk storage media, optical storage media, flash memory devices, etc.), as well as electrical, optical, acoustical or other form of propagated signals (e.g., carrier waves, infrared signals, digital signals, etc.), etc. According to the present embodiment, the machine-accessible medium may include the memory/data storage medium 113, the data storage medium 131, and/or the data storage medium 133.

The change of the refresh rate according to the power management method described above may have a consequential impact on the power consumption of the portable computing device 100. The power consumption (P) of the portable computing device 100 because of the operation of the display unit 124 at a particular refresh rate may be calculated as follows:

$$P=F^*C^*V_{swing}^*V_{supply} \quad \text{(eqn. 1)}$$

where F=line frequency=refresh rate * number of horizontal scan lines;

C=capitance;

$V_{swing}=V_{signal}$; and $V_{supply}$=power supply voltage

With all other variables being constant, a measure of the change in the power consumption of the display unit 124 as a consequence of change in refresh rate may be reflected in a ratio of the power equations (eqn. 1) at the slower and faster refresh rates:

$$\%\ \text{change}=100\%-(\text{refresh rate}_{slower}/\text{refresh rate}_{faster})*100\% \quad \text{(eqn. 2)}$$

With reference to this equation then, it will be recognized that the greater the difference between the slower and faster refresh rates used, the greater the change in the power consumption may be. Additionally, while these equations show the effect of change in refresh rate on power consumption of the display unit, the power consumption of other units, such as the memory controller and the display unit controller, will be impacted by the power management method.

As mentioned previously, the use of such a power management method is not limited to portable computers, such as laptops. Any computing device with a display unit, such as personal digital assistants (PDAs), mobile phones, and Linux machines, for example, may benefit from the above-mentioned power management method. In the example of a mobile phone, a first, slower refresh rate may be used with text messages, while a second, faster refresh rate may be used with streaming video.

Furthermore, the disclosed structures and methods have been described with reference to foregoing examples. It will, however, be evident that various modifications and changes may be made thereto without departing from the broader spirit and scope of this disclosure. The above specification and figures accordingly are to be regarded as illustrative rather than restrictive. Particular materials selected herein can be easily substituted for other materials that would be apparent to those skilled in the art and would nevertheless remain equivalent to the disclosed devices and methods.

What is claimed is:

1. A method to manage the power consumption of a display unit, the method comprising:

determining if a processor is in an idle state;

determining a level of graphics-intensive activity from a plurality of levels of graphics-intensive activity if the processor is not in an idle state;

using a first non-zero refresh rate if a first level of graphics-intensive activity is determined and the processor is not in an idle state;

using a second non-zero refresh rate different than the first refresh rate if a second level of graphics-intensive activity is determined and the processor is not in an idle state; and using a third non-zero refresh rate different than the first and the second refresh rates if the processor is in an idle state.

2. The method according to claim 1, wherein the method comprises:

using a third non-zero refresh rate slower than the first and second refresh rates if the processor is in an idle state.

3. The method according to claim 2, wherein the first refresh rate is 60 Hz, the second refresh rate is 50 Hz, and the third refresh rate is 30 Hz.

4. A computing device comprising:

a display unit capable of operating at first, second and third non-zero refresh rates, the first refresh rate being different than the second refresh rate and the third refresh rate being different than the first and the second refresh rates; and a processor operatively coupled to the display unit and having a set of instructions operating therein:

to determine if a processor is in an idle state;

to determine a level of graphics-intensive activity from a plurality of levels of graphics intensive activity if the processor is not in an idle state;

to cause the display unit to operate at the first refresh rate if a first level of graphics-intensive activity is determined and the processor is not in an idle state;

to cause the display unit to operate at the second refresh rate if a second level of graphics-intensive activity is determined and the processor is not in an idle state; and to cause the display unit to operate at the third refresh rate if the processor is in an idle state.

5. The computing device according to claim 4, wherein the processor has a set of instructions operating therein:

to cause the display unit to operate at a third refresh rate slower than the first and second refresh rates if the processor is in an idle state.

6. The computing device according to claim 5, wherein the display unit is an LCD display unit, the first refresh rate is 60 Hz, the second refresh rate is 50 Hz, and the third refresh rate is 30 Hz.

7. An article of manufacture comprising:

a machine-accessible medium that provides instructions that, if executed by a processor, will cause the processor to perform operations comprising:

determining if a processor is in an idle state;

determining a level of graphics-intensive activity from a plurality of levels of graphics intensive activity if the processor is not in an idle state;

causing the display unit to operate at a first non-zero refresh rate if a first level of graphics-intensive activity is determined and the processor is not in an idle state;

causing the display unit to operate at a second non-zero refresh rate different than the first refresh rate if a second level of graphics-intensive activity is determined and the processor is not in an idle state; and causing the display unit to operate at a third non-zero refresh rate if the processor is in an idle state.

8. The article according to claim 7, wherein the machine-accessible medium provides instructions that, if executed by a processor, will cause the processor to perform operations comprising:

causing a display unit to use a third non-zero refresh rate slower than the first and the second refresh rate if the processor is in an idle state.

9. The article according to claim 8, wherein the first refresh rate is 60 Hz, the second refresh rate is 50 Hz, and the third refresh rate is 30 Hz.

* * * * *